(12) United States Patent
Mattes

(10) Patent No.: US 7,226,076 B2
(45) Date of Patent: Jun. 5, 2007

(54) PROTECTION DEVICE

(75) Inventor: Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 10/513,908

(22) PCT Filed: Feb. 14, 2003

(86) PCT No.: PCT/DE03/00450

§ 371 (c)(1), (2), (4) Date: Nov. 8, 2004

(87) PCT Pub. No.: WO03/106224

PCT Pub. Date: Dec. 24, 2003

(65) Prior Publication Data

US 2005/0177289 A1 Aug. 11, 2005

(30) Foreign Application Priority Data

Jun. 13, 2002 (DE) ................ 102 26 255

(51) Int. Cl.
*B60R 21/015* (2006.01)
(52) U.S. Cl. .................................. 280/735
(58) Field of Classification Search ............... 180/271, 180/274; 280/734, 735
See application file for complete search history.

(56) References Cited

U.S. PATENT DOCUMENTS

| | | | | |
|---|---|---|---|---|
| 3,936,075 A | * | 2/1976 | Jelliffe | 280/751 |
| 4,706,072 A | * | 11/1987 | Ikeyama | 340/576 |
| 5,005,865 A | * | 4/1991 | Kruse | 280/801.1 |
| 5,232,243 A | * | 8/1993 | Blackburn et al. | 280/732 |
| 5,404,128 A | * | 4/1995 | Ogino et al. | 340/425.5 |
| 5,554,907 A | * | 9/1996 | Dixon | 310/339 |
| 5,570,903 A | * | 11/1996 | Meister et al. | 280/735 |
| 5,898,366 A | * | 4/1999 | Brown et al. | 340/457.1 |
| 6,164,693 A | * | 12/2000 | Mattes et al. | 280/735 |
| 6,195,008 B1 | * | 2/2001 | Bader | 340/573.1 |
| 6,259,042 B1 | * | 7/2001 | David | 177/136 |
| 6,474,683 B1 | * | 11/2002 | Breed et al. | 280/735 |
| 6,533,316 B2 | * | 3/2003 | Breed et al. | 280/735 |

FOREIGN PATENT DOCUMENTS

DE    198 56 129    6/2000
GB    2 289 563    11/1995

* cited by examiner

*Primary Examiner*—Paul N. Dickson
*Assistant Examiner*—Laura B. Freedman
(74) *Attorney, Agent, or Firm*—Kenyon & Kenyon LLP

(57) ABSTRACT

A protection device for a pregnant person in a vehicle is described, a sensor being provided for detecting the pregnant person and a restraint unit being configured in such a way that the usability of the restraint unit is influenceable as a function of a signal of the sensor. The restraint unit may be disabled in the event of an accident or its deployment force may be reduced or it is usable depending on the situation.

14 Claims, 1 Drawing Sheet

PROTECTION DEVICE

FIELD OF THE INVENTION

The present invention is directed to a protection device for a pregnant person in a vehicle.

SUMMARY OF THE INVENTION

The protection device according to the present invention for a pregnant woman in a vehicle has the advantage that the restraint means in a vehicle for the pregnant woman are activated in the event of an accident in such a way that the risk of injury to the woman and the unborn child are minimized.

It is particularly advantageous that first restraint means are disabled in the event of an accident if the presence of a pregnant woman is detected in order to minimize the risk of injury to the unborn child in particular, and the deployment force of second restraint means is reduced so that soft airbags are used, and third restraint means are provided which may be used depending on the situation. This includes restraint means offering optimum protection to the pregnant woman in particular in the event of an accident and as a function of the type of accident and her physical situation.

Furthermore, it is advantageous that the first restraint means are designed in such a way that seat belt locking and seat belt tensioning are disabled in the event of a frontal and/or side and/or rear impact. In the event of a frontal, rear, and side crash, the force of the lap belt and sometimes even of the shoulder belt, as well as of the steering wheel rim acting on the mother's abdomen, may cause injury or death to the unborn child. It is furthermore advantageous that the first restraint means disable seat belt locking in the event of rollover and tension the lap belt using a power belt tensioner when a predefined roll angle is reached. This roll angle is preferably 50°. This prevents the effect of force on the unborn child and at the same time secures the pregnant woman.

The second restraint means are advantageously configured in such a way that they are usable early using a low deployment force as a soft airbag, as opposed to its use for a non-pregnant person. Such soft airbags may also be used on the backrests of the front seats for pregnant persons sitting in the rear. Further protection may be achieved via "inflatable carpets" for expectant mothers sitting in the front seat.

It is furthermore advantageous that the third restraint means have a knee bag for preventing the pregnant person from slipping through the seat belt and/or a device for retracting the steering wheel and/or an airbag for cushioning the steering wheel.

It is furthermore advantageous that a display is configured in such a way that the detection of a pregnant person is displayable. This permits checking of the protection device according to the present invention in particular.

BRIEF DESCRIPTION OF THE DRAWINGS

Exemplary embodiments of the present invention are illustrated in the drawing and explained in greater detail in the description that follows.

DETAILED DESCRIPTION OF THE INVENTION

Figure 1:
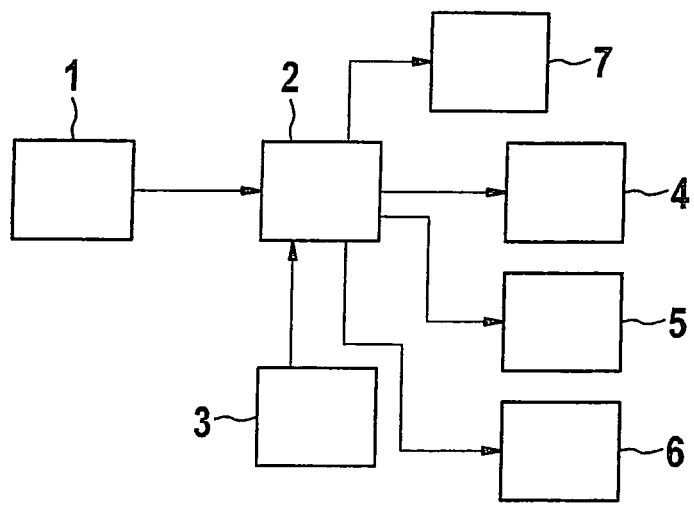
FIG. 1 shows a block diagram of the device according to the present invention.

Research has found that the most common cause of death of unborn children in the U.S. is automobile accidents. Not only is the risk of a crash the same for the fetus as for the pregnant mother, but the risk of injury is much higher, so that according to the present invention a protection device is provided, which is to offer the unborn child in particular optimum protection in the event of an accident.

The first prerequisite for protecting the unborn child is a sensor for recognizing women in an advanced stage of pregnancy. Such a sensor may measure the breathing and heart frequencies, for example. Because only one breathing pattern but two heartbeats are to be measured for an expectant mother, a pregnant woman may thus be recognized. A vibration sensor, for example, a piezoelectric vibration sensor, is preferably used for this purpose.

In the event of a frontal, rear, and side crash, the unborn child may suffer injuries or death due to the force exerted by the lap belt and sometimes also by the shoulder belt, as well as by the steering wheel rim on the mother's abdomen.

If a pregnant woman is detected according to the present invention, no seat belt locking and no seat belt tensioning is to take place in the event of a frontal, rear or side crash. The submarining effect, i.e., slipping through the seat belt, must be prevented by the deployment of the knee bag and the early deployment of a less aggressive, i.e., soft, airbag, including on the backrests of the front seats for pregnant women sitting in the rear. Extended protection may be provided by "inflatable carpets" for expectant mothers sitting in the front seat.

For the pregnant woman driving the vehicle, the steering wheel must additionally be retracted toward the front, preferably by a pyrotechnical actuator to obtain more clearance between the mother and the hard steering wheel parts. A suitably shaped airbag may also softly cushion the surface of the steering wheel including the steering wheel rim.

In the event of a rollover, seat belt locking should also be disabled; however, the lap belt should preferably be tensioned using a power belt tensioner after the vehicle has reached the stability roll angle of approximately 50° and the pregnant woman has been somewhat lifted off the seat. Impact of the pregnant woman's head against the roof must be avoided in the event of a rollover. The lap belt then presses against the woman's thighs, rather than her abdomen.

Seat belts are nowadays mostly locked using a mechanical sensor in the belt retractor, which acts directly upon the locking mechanism. Such sensors are no longer to be used for protecting the unborn child.

There are also electronic inclination and position sensors in which the principle of measurement is the change in the magnetic flux [measured using] a magnetic Hall system or with an optical system. Such a sensor could be used centrally in the vehicle for electrical triggering of all seat belt locking devices. If the presence of a pregnant woman is detected, the corresponding seat belt is not locked.

The airbag is deployed and the deployment of the seat belt tensioner is prevented in the event of a longitudinal or transverse impact, and the lap belt tensioner is triggered in the event of rollovers using the existing airbag deployment device using the triggering thresholds adjusted to the requirements of optimum protection for pregnant women. These thresholds are also modified as a function of time. The same holds true for activation of the steering wheel retractor.

FIG. 1 shows as a block diagram the protection device according to the present invention. A sensor 1 for detection of the pregnant woman is connected to a processor 2 in the airbag control unit. Sensor 1 is connected here to processor 2 via a two-wire line, i.e., data is only transmitted from sensor 1 to processor 2. As an alternative, a bus connection may also be provided between sensor 1 and processor 2. A simple bidirectional transmission link may also be provided here. Sensor 1 is a vibration sensor which works by the piezoelectric principle. It is therefore capable of detecting the pulse frequency and the breathing frequency of individuals in the passenger compartment. Sensor 1 is positioned so that it only registers the pulse frequency and breathing frequency of the individual sitting in a particular seat. If a pregnant person is sitting in the seat, the sensor detects only one breathing frequency, but at least two pulse rates. The pulse rate of the child is higher than that of the mother. A pregnant person may thus be detected.

Processor 2 is connected to first restraint means 4 via a first data output. These are restraint means whose function may be disabled as a function of the signal from sensor 1. They include belt tensioners and airbags. Processor 2 is connected to second restraint means 5, whose deployment force may be reduced as a function of the signal from sensor 1, via a second data output. Such restraint means include airbags in particular which are then triggered early, but with less intensity in the event of an accident. "Early" means here that the airbag is deployed earlier than in the case of a normal person to be protected. A "normal person" is understood here to be a non-pregnant person. "Soft airbag" means that the rate at which the airbag is inflated and the rate and mass flow of gas introduced into the airbag are reduced. This minimizes the risk of injury by the airbag. Processor 2 is connected to third restraint means 6, which are used in particular for protecting a pregnant person, via a third data output. Restraint means 6 may be a knee bag which is to prevent the person from slipping through the seat belt. Furthermore, restraint means 6 are to be understood as a device for retracting the steering wheel. This device, which operates by a pyrotechnical principle, is used in the event of an accident when the pregnant person is the driver of the vehicle. Injuries by impact of the pregnant woman against the steering wheel are thus minimized. In addition, restraint means 6 are to be understood as an airbag for the steering wheel rim which is deployed in the event of an accident. This minimizes injuries when the pregnant person contacts the steering wheel rim.

Furthermore, processor 2 is connected to a display 7, which shows that a pregnant person has been detected in a particular seat. As an alternative, the display may only show that a pregnant person has been detected in general. Processor 2 in the airbag control unit is furthermore connected to a sensor system 3 via a second data input, from which processor 2 receives the information that an accident is imminent, for example, from a pre-crash sensor system, and/or that an impact has occurred. For this purpose, impact sensors designed as acceleration sensors, for example, are used. Such impact sensors may be situated in the airbag control unit, which is preferably situated centrally in the vehicle, or outside this control unit. Such sensors may then be peripheral sensors which are distributed in the vehicle. Such sensors may be used in the front of the vehicle as upfront sensors. Instead of acceleration sensors, pressure sensors, temperature sensors, or other deformation sensors may be situated in the sides of the vehicle as satellite sensors.

Figure 2:
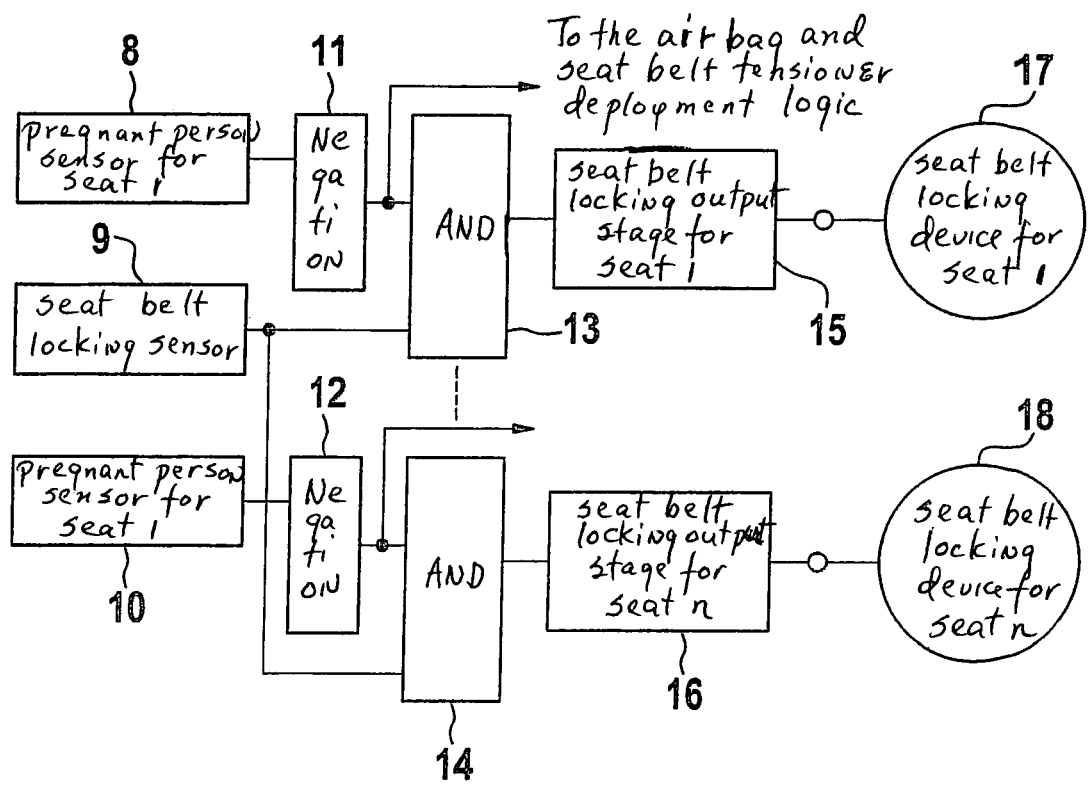
FIG. 2 shows an exemplary embodiment of the disabling device for the seat belt locking output stages.

FIG. 2 shows in an exemplary block diagram how seat belt locking may be disabled as a function of the signal from a sensor for the pregnant woman. A sensor 8 for detecting a pregnant woman is connected to a negation element 11. Negation element 11 is connected to an AND gate 13. A seat belt locking sensor 9, which shows that the seat belts are to be locked to restrain a person to be protected using a restraining force, is connected to a second input of AND gate 13. The negated signal of pregnancy sensor 8 is relayed to the airbag and seat belt tensioner deployment logic to initiate, also in this case, appropriate measures as explained above, for example, to deploy a soft airbag, deploy additional knee bags, or to tighten the lap belt using a power belt tensioner in the event of a rollover.

If a pregnant person is detected by sensor 8, AND gate 13 issues a logic 0 in the event of an accident when locking sensor 9 issues a logic 1. Seat belt locking output stage 15 for the seat where the pregnant person was detected is thus not activated, since seat belt locking output stage 15 is connected to the output of AND gate 13. Seat belt locking output stage 15 is also connected to seat belt locking device 17 for this seat. Seat belt locking output stage 15 is only activated when AND gate 13 issues a logic 1. However, the AND gate issues a logic 1 only when sensor 8 generates a logic 0 and seat belt locking sensor 9 issues a logic 1, i.e., when an accident is detected.

Seat belt locking sensor 9 is furthermore connected to an AND gate 14, which is assigned to another seat. A sensor 10 for detecting a pregnant person, which is connected to a negation gate 12, is also provided for this seat. Negation gate 12 is connected to the second data input of AND gate 14. The output of negation gate 12 is furthermore connected to the airbag and seat belt tensioner deployment logic to activate the second and third restraint means as needed. The output of AND gate 14 is connected to seat belt locking output stage 16, which is in turn connected to the seat belt locking device for seat 18. It is thus clear that seat belt locking sensor 9 is connected to all seat belt locking output stages for the particular seats. However, dedicated sensors 8 and 10 are provided for each seat for detecting a pregnant person.

What is claimed is:

1. A protection device for a pregnant person in a vehicle, comprising: a sensor (1, 8, 10) which detects whether a person in the vehicle is pregnant, and restraint means (4 through 6) which is activatable in such a way that usability of restraint means (4 through 6) is influenceable as a function of a signal of the sensor (1, 8, 10).

2. The protection device according to claim 1, wherein the protection device includes first restraint means (4) which may be disabled in the event of an accident, second restraint means (5) whose deployment force is reducible, and third restraint means (6) which is usable depending on the situation.

3. The protection device according to claim 2, wherein the first restraint means (4) is designed in such a way that it disables a seat belt locking and a seat belt tensioning in the event of a frontal or side or rear impact.

4. The protection device according to claim 3, wherein a display (7) is configured in such a way that the detection of the pregnant person is displayable.

5. The protection device according to claim 2, wherein the second restraint means (5) is configured in such a way that the second restraint means (5) is usable early using a reduced deployment force compared to the case of a non-pregnant person.

6. The protection device according to claim 5, wherein a display (7) is configured in such a way that the detection of the pregnant person is displayable.

7. The protection device according to claim 2, wherein the third restraint means (6) has a knee bag for preventing the person from slipping through the seat belt or a device for retracting the steering wheel or an airbag for cushioning the steering wheel.

8. The protection device according to claim 7, wherein a display (7) is configured in such a way that the detection of the pregnant person is displayable.

9. The protection device according to claim 2, wherein a display (7) is configured in such a way that the detection of the pregnant person is displayable.

10. The protection device according to claim 1, wherein a display (7) is configured in such a way that the detection of the pregnant person is displayable.

11. A protection device for a pregnant person in a vehicle, comprising:

a sensor (1, 8, 10) for detecting the pregnant person and restraint means (4 through 6) which is activatable in such a way usability of restraint means (4 through 6) is influenceablenas as a function of the sensor (1, 8, 10);

wherein the protection device includes first restraint means (4) which may be disabled in the event of an accident, second restraint means (5) whose deployment force is reducible, and third restraint means (6) which is usable depending on the situation; and wherein the first restraint means (4) disables seat belt locking in the event of a rollover and tensions a lap belt using a power belt tensioner when a predefined roll angle is reached.

12. The protection device according to claim 11, wherein the predefined roll angle is approximately 50°.

13. The protection device according to claim 12, wherein a display (7) is configured in such a way that the detection of the pregnant person is displayable.

14. The protection device according to claim 11, wherein a display (7) is configured in such a way that the detection of the pregnant person is displayable.

* * * * *